US012633535B2

(12) United States Patent
Yue

(10) Patent No.: US 12,633,535 B2
(45) Date of Patent: May 19, 2026

(54) ELECTROCHEMICAL DEVICE AND ELECTRONIC DEVICE CONTAINING SAME

(71) Applicant: Ningde Amperex Technology Limited, Ningde City (CN)

(72) Inventor: Yingying Yue, Ningde City (CN)

(73) Assignee: NINGDE AMPEREX TECHNOLOGY LIMITED, Ningde City (CN)

( * ) Notice: Subject to any disclaimer, the term of this patent is extended or adjusted under 35 U.S.C. 154(b) by 767 days.

(21) Appl. No.: 17/954,084

(22) Filed: Sep. 27, 2022

(65) Prior Publication Data

US 2023/0042151 A1 Feb. 9, 2023

Related U.S. Application Data

(63) Continuation of application No. PCT/CN2020/081800, filed on Mar. 27, 2020.

(51) Int. Cl.
*H01M 4/525* (2010.01)
*H01M 4/02* (2006.01)
(Continued)

(52) U.S. Cl.
CPC ........... *H01M 4/525* (2013.01); *H01M 4/505* (2013.01); *H01M 10/0525* (2013.01); *H01M 2004/021* (2013.01); *H01M 2004/028* (2013.01)

(58) Field of Classification Search
CPC .. H01M 4/525; H01M 4/505; H01M 10/0525; H01M 2004/021; H01M 2004/028; H01M 4/131
See application file for complete search history.

(56) References Cited

U.S. PATENT DOCUMENTS 6,699,618 B2 3/2004 Noda et al.
6,890,456 B2 5/2005 Noda et al.
(Continued)

FOREIGN PATENT DOCUMENTS

CN 1360739 A 7/2002
CN 101882679 A 11/2010
(Continued)

OTHER PUBLICATIONS

Office Action dated Jun. 6, 2022 issued in counterpart CN application No. 202080047061.7 with English translation. (20 pages).
(Continued)

*Primary Examiner* — Ula C Ruddock
*Assistant Examiner* — Sydney L Kline
(74) *Attorney, Agent, or Firm* — WHDA, LLP

(57) ABSTRACT

An electrochemical device, including a positive electrode. The positive electrode includes a positive current collector and a positive active material layer. The positive active material layer includes particles A and particles B. A circularity of a particle A is $R_A$, a cross-sectional area of the particle A is $S_A$, a circularity of a particle B is $R_B$, a cross-sectional area of the particle B is $S_B$, where $R_B < 0.4 \leq R_A$ and $S_B < 20 \ \mu m^2 \leq S_A$. Based on a total area of a cross section of the positive electrode in a direction perpendicular to the positive current collector, a ratio of a total area percent of the particles A to a total area percent of the particles B is 1:9 to 8:2. The electrochemical device exhibits excellent electrochemical performance, especially reduces the amount of generated gas and improves cycle stability of the electrochemical device.

20 Claims, 3 Drawing Sheets

(51) Int. Cl.

| | | |
|---|---|---|
| *H01M 4/505* | (2010.01) | |
| *H01M 10/0525* | (2010.01) | |

(56) References Cited

U.S. PATENT DOCUMENTS

| | | | |
|---|---|---|---|
| 7,090,822 | B2 | 8/2006 | Noda et al. |
| 8,980,125 | B2 | 3/2015 | Endoh |
| 2003/0054248 | A1 | 3/2003 | Noda et al. |
| 2004/0135128 | A1 | 7/2004 | Noda et al. |
| 2005/0175899 | A1 | 8/2005 | Noda et al. |
| 2010/0285366 | A1 | 11/2010 | Endoh |
| 2011/0223456 | A1* | 9/2011 | Sugaya .................. H01M 4/13 29/623.5 |
| 2013/0149604 | A1* | 6/2013 | Fujiki .................. H01M 4/667 429/211 |
| 2013/0288122 | A1* | 10/2013 | Matsushima ......... H01M 4/661 429/211 |
| 2014/0205871 | A1* | 7/2014 | Minami ............ H01M 10/4235 429/61 |
| 2014/0342230 | A1* | 11/2014 | Watanabe ............. H01M 4/505 429/223 |
| 2016/0190566 | A1* | 6/2016 | Shiozaki ............... H01M 4/661 429/231.1 |
| 2017/0263921 | A1* | 9/2017 | Choi ..................... H01M 4/525 |
| 2018/0083269 | A1* | 3/2018 | Iwasaki ................... H01M 4/62 |
| 2018/0287202 | A1* | 10/2018 | Matsushita ........... H01M 4/366 |

FOREIGN PATENT DOCUMENTS

| | | | |
|---|---|---|---|
| CN | 103782417 | A | 5/2014 |
| CN | 103930374 | A | 7/2014 |
| CN | 106099040 | A | 11/2016 |
| CN | 107464933 | A | 12/2017 |
| CN | 108023068 | A | 5/2018 |
| CN | 108431998 | A | 8/2018 |
| CN | 108713265 | A | 10/2018 |
| CN | 108807982 | A | 11/2018 |
| CN | 110247013 | A | 9/2019 |
| JP | 2017-199591 | A | 11/2017 |
| JP | 2018037393 | A * | 3/2018 |
| WO | 2017/047755 | A1 | 3/2017 |

OTHER PUBLICATIONS

International Search Report dated Nov. 2, 2020, issued in counterpart International Application No. PCT/CN2020/081800, with English Translation (4 pages).

Office Action dated Sep. 23, 2022, issued in counterpart CN Application No. 202080047061.7. (7 pages).

Extended (Supplementary) European Search Report dated Apr. 19, 2023, issued in counterpart EP Application No. 20927990.0. (11 pages).

Ndama, A. et al., Measurement of Electrical Resistivity of Powder; Comparison of Three Methods, International Journal of Engineering Trends and Technology, vol. 69, No. 8, p. 41-48, 2021. (8 pages); cited in Extended European Search Report dated Apr. 19, 2023.

Why Magnification is Irrelevant in Modern Scanning Electron Microscopes Application Note Introduction, Agilent Technologies, p. 1-8, 2011. (8 pages); cited in Extended European Search Report dated Apr. 19, 2023.

* cited by examiner

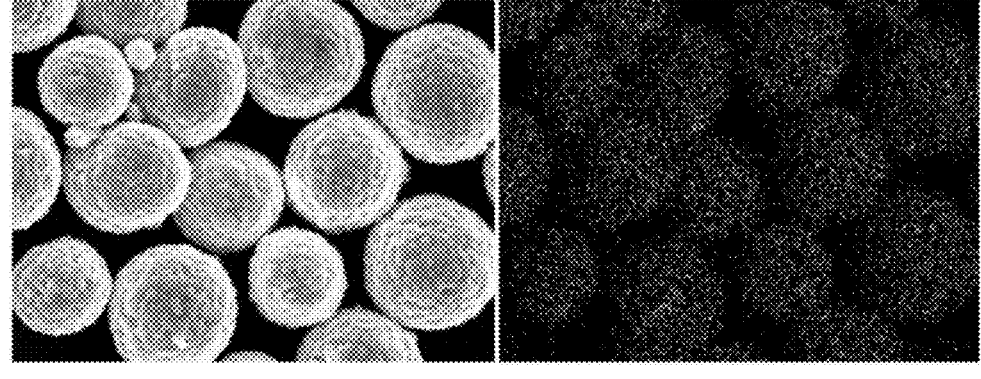
FIG. 2A                    FIG. 2B
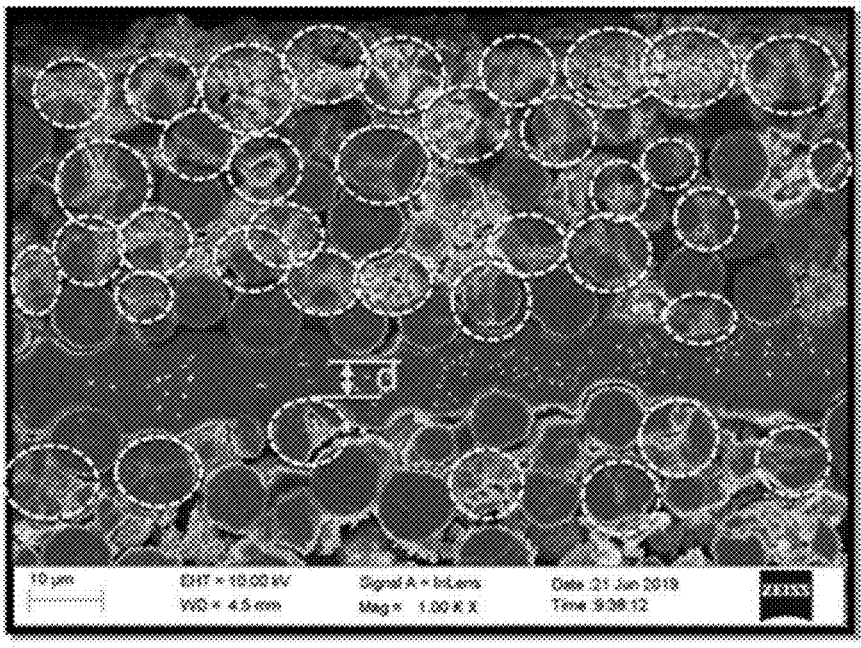
FIG. 3A

ELECTROCHEMICAL DEVICE AND ELECTRONIC DEVICE CONTAINING SAME

CROSS REFERENCE TO RELATED APPLICATIONS

The present application is a continuation application of PCT application PCT/CN2020/081800, filed on Mar. 27, 2020, the disclosure of which is hereby incorporated by reference in its entirety.

TECHNICAL FIELD

This application relates to the technical field of energy storage, and in particular, to an electrochemical device and an electronic device containing same.

BACKGROUND

With the popularization and application of smart products, people's demand for electronic products such as mobile phone, notebook computer, and camera is increasing year by year. An electrochemical device serving as a power supply of the electronic products is increasingly important in our daily lives. By virtue of advantages such as high specific energy, high working voltage, low self-discharge rate, small size, and light weight, lithium-ion batteries are widely applied in the field of consumer electronics.

However, with the wide application of the electrochemical devices in electric vehicles, mobile electronic devices, and unmanned aerial vehicles, people have imposed higher requirements on the electrochemical devices. Using electric vehicles as an example, people require an electric vehicle to have a long cruising range, thereby requiring an energy device in the electric vehicle to have a high energy density. In addition, people require the energy device to have a long service life, thereby requiring a capacity of the energy device not to fade rapidly with the increase of charge-and-discharge cycles. To meet such requirements, synthesis of positive and negative electrode materials with high specific capacity and high cycle stability has become one of hot research topics in recent years.

SUMMARY

This application provides an electrochemical device and an electronic device in which the electrochemical device is applied, in an attempt to solve at least one problem in the related art to at least some extent.

According to an aspect of this application, this application provides an electrochemical device. The electrochemical device includes a positive electrode. The positive electrode includes a positive current collector and a positive active material layer. The positive active material layer includes particles A and particles B. A circularity of a particle A is $R_A$, a cross-sectional area of the particle A is $S_A$, a circularity of a particle B is $R_B$, a cross-sectional area of the particle B is $S_B$, where $R_B < 0.4 \le R_A$ and $S_B < 20 \ \mu m^2 \le S_A$. Based on a total area of a cross section of the positive active material layer in a direction perpendicular to the positive current collector, a ratio of a total area percent of the particles A to a total area percent of the particles B is 1:9 to 8:2.

According to an embodiment of this application, the particles A satisfy at least one of relational expressions (a) to (c): (a) based on the total area of the cross section of the positive active material layer in the direction perpendicular to the positive current collector, the total area percent of the particles A is 5% to 50%; (b) a resistivity of the particle A is 6 $\Omega \cdot cm$ to 10 $\Omega \cdot cm$; and (c) the particle A includes a compound represented by a formula $Li_{1+a}Ni_xMn_yCo_zM_mO_2$, where $-0.05 \le a < 0.3$, $0.8 \le x < 1$, $0 < y \le 0.2$, $0 < z \le 0.2$, $0 < m < 0.2$, and the element M is one or more selected from the group consisting of Al, Ti, W, Zr, Nb, In, Ru, Sb, Sr and Y.

According to an embodiment of this application, the particles A include broken particles. The broken particles satisfy at least one of the conditions (d) to (e): (d) based on the total area of the cross section of the positive active material layer in the direction perpendicular to the positive current collector, a total area percent of the broken particles is not greater than 15%; and (e) based on a total area of the particles A, the total area percent of the broken particles is not greater than 30%.

According to an embodiment of this application, the particles B satisfy at least one of the conditions (f) to (h): (f) based on the total area of the cross section of the positive active material layer in the direction perpendicular to the positive current collector, the total area percent of the particles B is 5% to 60%; (g) a resistivity of the particle B is 20 $\Omega \cdot cm$ to 40 $\Omega \cdot cm$; and (h) the particle B includes a compound represented by a formula $Li_{1+a}Ni_xMn_yCo_zM_mO_2$, where $-0.055 \le a < 0.3$, $0.8 \le x < 1$, $0 < y \le 0.2$, $0 < z \le 0.2$, $0 < m < 0.2$, and the element M is one or more selected from the group consisting of Al, Ti, W, Zr, Nb, In, Ru, Sb, Sr and Y.

According to an embodiment of this application, the positive active material layer satisfies at least one of the conditions (i) to (j): (i) a porosity of the positive active material layer is less than or equal to 25%; and (j) in a TG-MS test, a positive active material of the positive active material layer produces an oxygen release peak at 230° C. to 245° C.

According to an embodiment of this application, a specific surface area of the positive active material is 0.1 $m^2/g$ to 1.2 $m^2/g$.

According to an embodiment of this application, the positive active material layer further includes a binder and a conductive agent. Based on a total mass of the positive active material layer, a weight percent of the binder is 1.25% to 5%.

According to an embodiment of this application, the positive electrode further includes a functional layer. The functional layer is disposed on the positive active material layer and/or disposed between the positive active material layer and the positive current collector.

According to an embodiment of this application, the functional layer satisfies at least one of the conditions (1) to (4): (1) the functional layer is disposed on the positive active material layer, the positive active material layer is disposed on the positive current collector, and a ratio of a thickness of the positive active material layer to a thickness of the functional layer is 99:1 to 50:50; (2) the functional layer is disposed between the positive active material layer and the positive current collector, and the ratio of the thickness of the positive active material layer to the thickness of the functional layer is 99:1 to 50:50; (3) the functional layer is disposed on the positive active material layer, the functional layer is disposed between the positive active material layer and the positive current collector, and the ratio of the thickness of the positive active material layer to the thickness of the functional layer is 99:1 to 50:50; and (4) the functional layer includes a material C, the material C includes at least one of lithium cobalt oxide, lithium iron phosphate, lithium manganese iron phosphate, or lithium manganese oxide, and a particle diameter $D_{v50}$ of the material C is 0.5 $\mu m$ to 6 $\mu m$.

According to an embodiment of this application, a deformation rate of the positive current collector is less than or equal to 32%.

According to an aspect of this application, this application provides an electronic device, including the electrochemical device according to this application.

In at least one aspect, by using both particles A and particles B as the positive active materials of the electrochemical device, this application effectively solves the problems such as particle breakage, surface side reactions, and oxygen release in electrochemical device during high-temperature storage and charge-and-discharge cycles, thereby reducing the gassing amount of the electrochemical device and improving the cycle stability of the electrochemical device, where the particles A and the particles B possess different circularities and different cross-sectional areas.

Additional aspects and advantages of this application will be partly described or illustrated later herein or expounded through implementation of the embodiments of this application.

BRIEF DESCRIPTION OF DRAWINGS

For ease of describing the embodiments of this application, the following outlines the drawings needed for describing the embodiments of this application or the prior art. Evidently, the drawings outlined below are merely a part of embodiments in this application. Without making any creative efforts, a person skilled in the art can still derive the drawings of other embodiments according to the structures illustrated in these drawings.

FIG. 2A shows an SEM image of $LiNi_{0.88}Co_{0.09}Mn_{0.028}Zr_{0.002}O_2$ particles A, and FIG. 2B is an image of bulk phase distribution of a doping element Zr in polycrystalline particles; and FIG. 3A and FIG. 3B are an interface diagram of a cold-pressed positive electrode in Comparative Embodiment 1 and Embodiment 3 respectively.

DETAILED DESCRIPTION

Figure 1A:
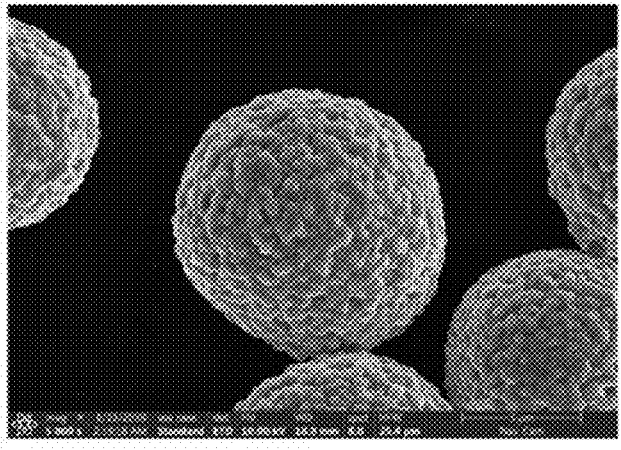
FIG. 1A and FIG. 1B are scanning electron microscope (SEM) images of $LiNi_{0.88}Co_{0.09}Mn_{0.03}O_2$ particles A and $LiNi_{0.88}Co_{0.09}Mn_{0.03}O_2$ particles B respectively.

Embodiments of this application will be described in detail below. Throughout the specification of this application, the same or similar components and the components having the same or similar functions are denoted by similar reference numerals. The embodiments described herein with reference to the drawings are illustrative and graphical in nature, and are intended to enable a basic understanding of this application. The embodiments of this application are not to be construed as a limitation on this application.

In addition, a quantity, a ratio, or another numerical value herein is sometimes expressed in the format of a range. Understandably, the format of a range is intended for convenience and brevity, and needs to be flexibly understood to include not only the numerical values explicitly specified and defined in the range, but also all individual numerical values or sub-ranges covered in the range as if each individual numerical value and each sub-range were explicitly specified.

In the description of specific embodiments and claims, a list of items referred to by using the terms such as "one or more of", "one or more thereof", "one or more types of", "at least one of", or other similar terms may mean any combination of the listed items. For example, if items A and B are listed, the phrases "at least one of A and B" and "at least one of A or B" mean: A alone; B alone; or both A and B. In another example, if items A, B. and C are listed, the phrases "at least one of A. B, and C" and "at least one of A, B, or C" mean: A alone; B alone; C alone; A and B (excluding C); A and C (excluding B); B and C (excluding A); or all of A, B, and C. The item A may include a single element or a plurality of elements. The item B may include a single element or a plurality of elements. The item C may include a single element or a plurality of elements.

The term "circularity" means the degree to which a figure of the cross section of a particle is as circular as a theoretical circle. Circularity $R=(4\pi \times area)/(perimeter \times perimeter)$. When R is 1, the particle is in a circular shape. The smaller the value of R, the more irregular the morphology of the particle, and the greater the deviation from a circle. In this application, the circularity of the particles of the positive active material is measured by using a circularity meter. For the specific measurement method, refer to the specific embodiments described below.

The term "broken particles" means continuous wrinkle lines not less than 0.1 μm in length and not less than 0.01 μm in width in a cross section of a particle in an image obtained by using a scanning electron microscope. The wrinkle lines of such size are regarded as cracks, and particles with cracks are regarded as broken particles.

The term "median diameter $D_{v50}$" represents a diameter of particles measured when the cumulative volume percentage of the measured particles reaches 50% of the total volume of all specimen particles in a volume-based particle size distribution curve viewed from a small-diameter side.

I. Electrochemical Device

Currently, most lithium-ion batteries in the market use a lithium cobalt oxide as a positive active material. However, the element cobalt is highly toxic, costly, and scarce. Therefore, low-cobalt positive active materials are an inevitable trend in the development of electrochemical devices. In a new generation of lithium-ion batteries, a positive active material with a very promising prospect of application is a nickel-containing material, especially a high-nickel material. The high-nickel material means a material in which a molar percent of nickel is at least 50% based on a total content of metal elements other than metallic lithium in the positive active material.

In a nickel-containing ternary material serving as a positive active material, a main function of nickel is to increase an energy density. With the same charge-and-discharge voltage range, the higher the nickel content, the higher the gram capacity. However, in practical applications of the high-nickel materials in an electrochemical device, the high-nickel material incurs a high amount of delithiation under the same voltage, and a unit cell of the particles expands and shrinks greatly in volume. Consequently, the particles are prone to break and side-react with an electrolytic solution. After the particles are broken, a new interface is exposed, and the electrolytic solution permeates into the particles through cracks and side-reacts with a positive active material located at the new interface. The side reaction aggravates the gassing and causes the capacity of the electrochemical device to fade rapidly with the progress of the charge-and-discharge cycles. In addition, in a process of charging the electrochemical device, as lithium ions are continuously deintercalated from the positive active material, the force of bonding between active metal (such as nickel) and oxygen in the positive active material is weakened so that oxygen is released. The released oxygen oxidizes the electrolytic solution and aggravates the gassing. Such problems severely restrict the application of the high-nickel material in high-energy-density electrochemical devices.

Based on at least the above insight into the high-nickel materials, this application proposes to introduce both a particle A and a particle B as positive active materials into the positive active material layer to manufacture a positive electrode of an electrochemical device, so as to overcome the above defects of the high-nickel materials.

Figure 1B:
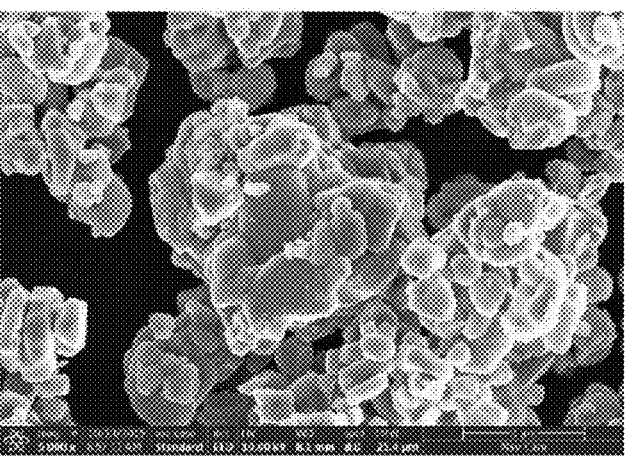

The particle A is an aggregation of numerous monocrystalline particles, and a monocrystalline particle in the particle A is a crystal inside which a plurality of particulate matters are regularly and periodically arranged in a three-dimensional space. As shown in FIG. 1A of this application, a morphology of the particle A is spherical or ellipsoidal, with a relatively high circularity $R_A$ and a relatively large cross-sectional area $S_A$. In some embodiments of this application, the particle A is a polycrystalline particle. Compared with the particle A, the particle B is an aggregation of monocrystals with a relatively large grain size. As shown in FIG. 1B of this application, a morphology of the particle B is irregular, with a relatively low circularity $R_B$ and a relatively small cross-sectional area $S_B$. In some embodiments of this application, the particle B is a quasi-monocrystalline particle.

In some embodiments, the particle A and the particle B of the positive active material satisfy $R_B<0.4 \leq R_A$ and $S_B<20$ $\mu m^2 \leq S_A$. The electrochemical performance of the electrochemical device can be further optimized by controlling the adding ratio of the particle A and the particle B. In some embodiments, based on a total area of a cross section of the positive active material layer in a direction perpendicular to the positive current collector, a ratio of a total area percent of the particles A to a total area percent of the particles B is 1:9 to 8:2. In some embodiments, the ratio of the total area percent of the particles A to the total area percent of the particles B is 2:8 to 8:2.

One of the reasons why the electrochemical performance of the electrochemical device according to this application can be improved is that the particles B added can effectively reduce the degree of breakage of the particles A. A process of charging or discharging the electrochemical device is a process by which lithium ions are intercalated into and deintercalated from the particles of the positive active material. In this process, the unit cell of the particles of the positive active material shrinks and expands violently in volume. The particles A are relatively large in size, and the contact between a plurality of particle A is rigid contact. Therefore, when the unit cell of each particle A expands and shrinks violently in volume, rigid collisions occur between the particles A, thereby aggravating breakage of the particles. In contrast, the particle B is irregular in morphology and relatively small in size. After the particle B is added into the particles A, the particle B exerts a good cushioning effect between two particles A. and reduces rigid collision between the particles A, thereby reducing particle breakage and suppressing side reactions.

With a high circularity and a large cross-sectional area, the particle A possesses the advantage of a low resistivity, but the particle A is prone to break during cold pressing and/or cycling. The electrochemical performance of the electrochemical device can be further optimized by optimizing at least one of: the area percent of the particles A in the positive active material layer, the resistivity, or a specific component of the particles. In some embodiments, based on the total area of the cross section of the positive active material layer in the direction perpendicular to the positive current collector, the total area percent of the particles A is 5% to 50%. In some embodiments, based on the total area of the cross section of the positive active material layer in the direction perpendicular to the positive current collector, the total area percent of the particles A is 5% to 45%. In some embodiments, based on the total area of the cross section of the positive active material layer in the direction perpendicular to the positive current collector, the area percent of the particles A is 8% to 30%. With the total area percent of the particles A falling within the range specified above, the electrochemical device obtained achieves excellent electrochemical performance, and especially, reduces the gassing amount significantly under high-temperature storage conditions, and achieves significantly improved cycle stability.

In this application, the particle A possesses a relatively low powder resistivity to accelerate the transport of electrons between the particles A. In some embodiments, the powder resistivity of the particle A is not greater than 10 $\Omega \cdot cm$. In some embodiments, the powder resistivity of the particle A is not greater than 9 $\Omega \cdot cm$. In some embodiments, the powder resistivity of the particle A is not greater than 8 $\Omega \cdot cm$. In some embodiments, the powder resistivity of the particle A is 6 $\Omega \cdot cm$ to 10 $\Omega \cdot cm$.

In some embodiments, the particle A is a nickel-containing ternary material. The term "ternary material" is a ternary material known in the art, for example, a ternary material specified in *Ternary Material of Lithium-ion Batteries—Process Technology and Application in Production* (by Wang Weidong, Qiu Weihua, Ding Qianqian et al., Chemical Industry Press, May 2015). In some embodiments, the nickel-containing ternary material referred to herein includes lithium nickel cobalt manganese oxide.

In some embodiments, the particle A includes, or is at least one selected from, compounds represented by a formula $Li_{1+a}Ni_xMn_yCo_zM_mO_2$, where $-0.05 \leq a < 0.3$, $0.8 \leq x <$, $0 < y \leq 0.2$, $0 < z \leq 0.2$, $0 < m < 0.2$, and the element M includes, or is one or more selected from the group consisting of, Al, Ti, W, Zr, Nb, In, Ru, Sb, Sr and Y. In some embodiments, the element M can be uniformly doped in the bulk and on the surface of the particle A. For example, as shown in FIG. 2B, the component of the particle A in Embodiment 4 of this application is $LiNi_{0.88}Co_{0.09}Mn_{0.028}Zr_{0.002}O_2$, and the doped element Zr is uniformly distributed on the surface and in the bulk of the particle A.

In a process of making the particles A into a positive electrode, the positive active material particles need to be compactly pressed together by cold-pressing, so as to increase a compacted density (CD for short) of the positive active material layer, and in turn, increase the energy density of the electrochemical device and reduce a direct-current resistance (DCR) of the electrochemical device. In addition, during the cold-pressing, the positive active material layer and the positive current collector are also compactly pressed together to prevent the positive active material layer from detaching from the positive current collector during charge-and-discharge cycles of the electrochemical device. However, the cold-pressing process may result in breakage of the particles A. The compacted density is positively correlated with the degree of breakage of the particles A. That is, the greater the compacted density, the severer the breakage of the particles A. Therefore, reducing the degree of breakage of the particles A while keeping an electrode plate in a high-compacted-density state is also one of the technical problems concerned by this application.

In this application, the particle B added exerts a good cushioning effect. Therefore, in some embodiments, under a high compacted density (for example, as high as 3.5 g/cc), based on the total area of the cross section of the positive active material layer in the direction perpendicular to the positive current collector, the total area percent of broken particles in the particles A is not greater than 15%. In some embodiments, under a high compacted density (for example, as high as 3.5 g/cc), based on the total area of the cross section of the positive active material layer in the direction perpendicular to the positive current collector, the total area percent of broken particles in the particles A is not greater than 14%. In some embodiments, under a high compacted density (for example, as high as 3.5 g/cc), based on the total area of the cross section of the positive active material layer in the direction perpendicular to the positive current collector, the area percent of broken particles in the particles A is not greater than 12%. In some embodiments, under a high compacted density (for example, as high as 3.5 g/cc), based on the total area of the cross section of the positive active material layer in the direction perpendicular to the positive current collector, the total area percent of broken particles in the particles A is not greater than 11%.

In some embodiments, under a high compacted density (for example, as high as 3.5 g/cc), based on the total area of the particles A, the total area percent of broken particles is not greater than 30%. In some embodiments, under a high compacted density (for example, as high as 3.5 g/cc), based on the total area of the particles A, the total area percent of broken particles is not greater than 24%. In some embodiments, under a high compacted density (for example, as high as 3.5 g/cc), based on the total area of the particles A, the total area percent of broken particles is not greater than 20%.

The particle B possesses a low circularity and a small cross-sectional area, and serves to: reduce the degree of breakage of the particles A during electrode preparation (especially cold-pressing) and charge-and-discharge cycles of the electrochemical device; increase the compacted density of the electrode plate; and provide more electrochemically active sites to improve a specific discharge capacity. The electrochemical performance of the electrochemical device can be further optimized by optimizing at least one of: the area percent of the particles B in the positive active material layer, the resistivity, or a specific component of the particles. In some embodiments, based on the total area of the cross section of the positive active material layer in the direction perpendicular to the positive current collector, the area percent of the particles B is 5% to 60%. In some embodiments, based on the total area of the cross section of the positive active material layer in the direction perpendicular to the positive current collector, the area percent of the particles B is 8% to 55%. In some embodiments, based on the total area of the cross section of the positive active material layer in the direction perpendicular to the positive current collector, the area percent of the particles B is 10% to 40%.

Due to a small diameter of particle B, contact compactness between the particles B is lower than that of the particles A under the same pressure. Consequently, the powder resistivity of the particle B is higher than that of the particle A as measured under the same pressure. In some embodiments, the powder resistivity of the particle B is 20 Ω·cm to 40 Ω·cm. In some embodiments, the powder resistivity of the particle B is 25 Ω·cm to 35 Ω·cm. In this application, the resistivity is measured by using a resistivity meter.

A specific component of the particle B may be the same as that of the particle A, or may be different from that of the particle A. In some embodiments, the particle B includes, or is at least one selected from, compounds represented by a formula $Li_{1+a}Ni_xMn_yCo_zM_mO_2$, where $-0.055 \leq a < 0.3$, $0.8 \leq x < 1$, $0 < y \leq 02$, $0 < z \leq 0.2$, $0 < m < 0.2$, and the element M includes, or is one or more selected from the group consisting of, Al, Ti, W, Zr, Nb, In, Ru, Sb, Sr and Y.

The porosity of the positive active material layer also affects the gassing of the electrochemical device. Specifically, when the porosity of the positive active material layer is higher, more electrolytic solution can be stored in the pores, more side reactions are induced, and the gassing amount is larger. In some embodiments, the porosity of the positive active material layer is not greater than 25%. In some embodiments, the porosity of the positive active material layer is not greater than 19%. An excessive porosity increases the side reactions and gassing amount in the electrochemical device.

In some embodiments, as measured by thermogravimetric-mass spectrometry (TG-MS for short), the positive active material of the positive active material layer produces an oxygen release peak at 230° C. to 245° C. This shows that the doping can suppress the release of oxygen in the material and enhance structural stability of the material.

The particle size (such as median diameter $D_{v50}$) of the positive active material also affects electrochemical performance of the material in the electrochemical device. With a smaller particle size of the positive active material, a specific surface area of the positive active material is larger, the positive active material provides a larger quantity of electrochemically active sites, and accordingly, a specific discharge capacity of the positive active material is also higher. However, a deficient particle size gives rise to some side effects. For example, when the particle size is smaller, an exposed surface of the particles is larger, the side reactions between the particles and the electrolytic solution are severer, and the risk of breaking the particles and generating gas is higher. Therefore, if the particle size and the specific surface area of the positive active material are controlled within an appropriate range, the electrochemical performance of the positive active material will be further optimized.

In some embodiments, the specific surface area of the positive active material according to this application is 0.05 $m^2/g$ to 2.0 $m^2/g$. In some embodiments, the specific surface area of the positive active material according to this application is 0.1 $m^2/g$ to 1.5 $m^2/g$. In some embodiments, the specific surface area of the positive active material according to this application is 0.1 $m^2/g$ to 1.2 $m^2/g$. In this application, the specific surface area of the positive active material is measured by using a BET physical adsorption instrument. For a detailed test method, reference may be made to the embodiments to be described herein later.

In some embodiments, the positive current collector employed in this application may be a positive current collector commonly used in the art, and may include, but without being limited to, an aluminum foil or a nickel foil.

In some embodiments, the positive active material layer further includes a binder and a conductive agent in addition to the positive active material according to this application.

The binder enhances bonding between particles of the positive active material, and also enhances bonding between the positive active material and the positive current collector. In this application, non-restrictive examples of the binder include polyvinyl alcohol, hydroxypropyl cellulose, diacetyl cellulose, polyvinyl chloride, carboxylated polyvinyl chloride, polyvinyl fluoride, a polymer containing ethylene oxide, polyvinylpyrrolidone, polyurethane, polytetrafluoroethylene, poly (1,1-difluoroethylene), polyethylene, polypropylene, styrene-butadiene rubber, acrylic styrene-butadiene rubber, epoxy resin, and nylon.

The conductive agent may be used to enhance conductivity of the electrode. This application may use any conductive material as the conductive agent, as long as the conductive material does not cause unwanted chemical changes. In this application, non-restrictive examples of the conductive material include a carbon-based material (for example, natural graphite, artificial graphite, carbon black, acetylene black, Ketjen black, and carbon fiber), a metal-based material (for example, metal powder, metal fiber, including copper, nickel, aluminum, silver, and the like), a conductive polymer (for example, a polyphenylene derivative), and any mixture thereof.

It is found in this application that, if the weight percent of the binder in the positive electrode is deficient, the positive active material layer may be detached from the positive current collector during the charge-and-discharge cycles and high-temperature storage of the electrochemical device, thereby aggravating the gassing and side reactions, and greatly increasing the impedance of electrochemical device. Therefore, as an improvement made in this application, by optimizing the weight percent of the binder in the positive active material layer, this application can further optimize the electrochemical performance of the electrochemical device. In some embodiments of this application, based on the total mass of the positive active material layer, the weight percent of the binder is 1% to 5%. In some embodiments of this application, the weight percent of the binder is 1.25% to 5%. In some embodiments of this application, the weight percent of the binder is 1.5% to 5%. In some embodiments of this application, the weight percent of the binder is 1.5% to 4.5%. In some embodiments of this application, the weight percent of the binder is 1.5% to 4%. In some embodiments of this application, the weight percent of the binder is 1.8% to 4%.

In some embodiments, the positive electrode further includes one or more functional layers. The functional layer is disposed on the positive active material layer and/or disposed between the positive active material layer and the positive current collector to implement specific functions.

In some embodiments, the functional layer includes a first functional layer disposed between the positive active material layer and the positive current collector. The ratio of the thickness of the positive active material layer to the thickness of the first functional layer is 99:1 to 50:50; Compared with large-diameter particles, small-diameter particles are more flexible under the same pressure, and are less prone to breakage. Therefore, in some embodiments, the first functional layer includes or is selected from particles with a median diameter $D_{v50}$ of 1.5 μm to 6 μm. The first functional layer is located between the positive active material layer and the positive current collector, and can reduce the deformation rate of the positive current collector during the cold-pressing, so as to keep corrosion resistance of the positive current collector. In addition, the first functional layer serves a cushioning function during the cold-pressing, so as to protect the particles A in the positive active material layer from being broken by a cold-pressing stress during the cold-pressing.

In some embodiments, the first functional layer includes one or more of or is one or more selected from the quasi-monocrystalline particle B, the LMFP, or the LMO mentioned herein. The chemical formula of the LMFP is $LiFe_{1-x}$ $Me_zXO_4$, where the element Me is one or more of the elements in Group VIIB and Group VIII in the periodic table, the element X includes one or more of or is one or more selected from the group consisting of P, Si, S, As and Sb, and $0 \leq x < 1$. The chemical formula of the LMO is $LiMn_yMd_{2-y}O_4$, where the element M is one or more selected from the group consisting of Al, Mg, Mn, Ni, Co, Fe, Gr, V, Ti, Cu, B, Ga, Zn, Zr, Nb, Mo, Sr, Sb, W and Bi, and $0 < y \leq 2$. In some embodiments, the first functional layer includes at least one of or is at least one selected from lithium cobalt oxide, lithium iron phosphate, lithium manganese iron phosphate, or lithium manganese oxide.

In some embodiments, the functional layer includes a second functional layer. The second functional layer is disposed on the positive active material layer, and the positive active material layer is disposed on the positive current collector. The ratio of the thickness of the positive active material layer to the thickness of the second functional layer is 99:1 to 50:50. In some embodiments, similar to the first functional layer, the second functional layer includes or is selected from particles with a median diameter $D_{v50}$ of 0.5 μm to 6 μm. In some embodiments, the second functional layer includes one or more of or is one or more selected from the particle B, the LMFP, or the LMO mentioned herein. In some embodiments, the second functional layer includes at least one of or is at least one selected from lithium cobalt oxide, lithium iron phosphate, lithium manganese iron phosphate, or lithium manganese oxide. The second functional layer overlays the surface of the positive active material layer, and serves a cushioning function to protect the polycrystalline particles A in the positive active material layer from being broken by a cold-pressing stress during the cold-pressing.

In some embodiments, the functional layer includes both the first functional layer and the second functional layer described above. The ratio of the thickness of the positive active material layer to the sum of thicknesses of the first functional layer and the second functional layer is 99:1 to 50:50. In some embodiments, the ratio of the thickness of the positive active material layer to the sum of thicknesses of the first functional layer and the second functional layer is 99:1 to 50:50.

Under a high compacted density (for example, a compacted density higher than 3.4 g/cc), the deformation rate of the positive current collector (such as an aluminum foil) increases. Consequently, the weight of the positive active material applied per unit area of the positive current collector decreases, thereby impairing the processing performance. In addition, the surface of the positive current collector usually contains a protection layer against electrolytic solution corrosion. When the deformation rate of the positive current collector is relatively high, the protection layer on the surface of the positive current collector is prone to be damaged, thereby reducing the resistance of the positive current collector to the electrolytic solution corrosion.

Figure 3B:
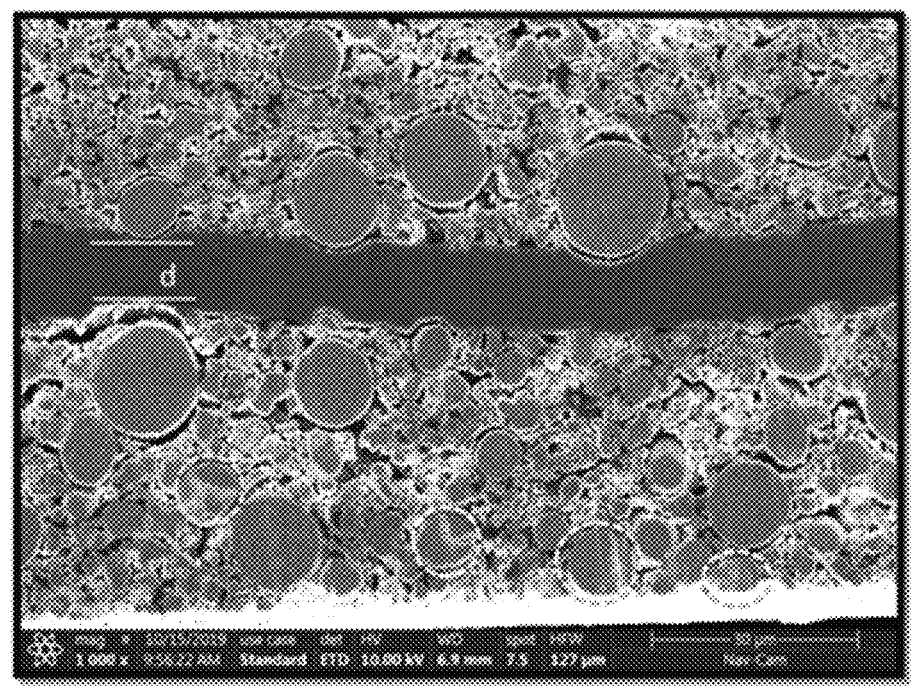

However, in some embodiments of this application, when the compacted density is 3.4 g/cc or higher, the deformation rate of the positive current collector is not greater than 40%. In some embodiments, when the compacted density is 3.4 g/cc or higher, the deformation rate of the positive current collector is not greater than 30%. In some embodiments, when the compacted density is 3.4 g/cc or higher, the deformation rate of the positive current collector is not greater than 20%. In some embodiments, when the compacted density is 3.4 g/cc or higher, the deformation rate of the positive current collector is not greater than 10%. In some embodiments, when the compacted density is 3.4 g/cc or higher, the deformation rate of the positive current collector is not greater than 5%. In this application, the deformation rate of the positive current collector means a ratio of a thickness of an undeformed part of the positive current collector in the thickness direction to an inherent thickness of the positive current collector. For example, referring to the SEM images shown in FIG. 3A and FIG. 3B, a calculation formula of the deformation rate of the positive current collector is: (inherent thickness of the positive current collector−d)/inherent thickness of the positive current collector×100%.

In some embodiments, the electrochemical device according to this application further includes a negative electrode. The negative electrode includes a negative active material layer and a negative current collector, and the negative active material layer includes the negative active material according to this application. The negative active material enables reversible intercalation and deintercalation of lithium ions. The specific type of the negative active material is not limited, and may be selected as required. In some embodiments, the negative active material includes one or more of or is one or more selected from the following materials: a carbonaceous material, a siliceous material, an alloy material, a composite oxide material containing lithium metal, or the like. In some embodiments, non-restrictive examples of the carbonaceous material include crystalline carbon, non-crystalline carbon, and a mixture thereof. In some embodiments, the crystalline carbon may be amorphous or sheet-shaped, mini-sheet-shaped, spherical or fibrous natural graphite or artificial graphite. In some embodiments, the non-crystalline carbon may be soft carbon, hard carbon, mesophase pitch carbide, calcined coke, or the like.

In some embodiments, examples of the negative active material may include, but without being limited to, at least one of natural graphite, artificial graphite, mesocarbon microbead (MCMB for short), hard carbon, soft carbon, silicon, a silicon-carbon composite, Li—Sn alloy, Li—Sn—O alloy, Sn, SnO, $SnO_2$, spinel-structured lithiated $TiO_2$—$Li_4Ti_5O_{12}$, or Li—Al alloy.

In some embodiments, the negative current collector may be a negative current collector commonly used in the art, and includes but is not limited to: a copper foil, a nickel foil, a stainless steel foil, a titanium foil, foamed nickel, foamed copper, a conductive metal-clad polymer substrate, and any combination thereof.

In some embodiments, the negative active material layer according to this application further includes a binder and a conductive agent in addition to the negative active material. The binder and conductive agent in the negative electrode may be made from the same materials as described above, details of which are omitted here.

On the basis of modification of the positive active material, if an electrolytic solution system is further improved, an interface of the positive active material can be better stabilized, the side reactions between the positive active material and the electrolytic solution can be suppressed, and therefore, the gassing amount is reduced and the cycle performance of electrochemical device is improved. The electrolytic solution may be classed into aqueous electrolytic solutions and nonaqueous electrolytic solutions. In contrast with an aqueous electrolytic solution, an electrochemical device that adopts a nonaqueous electrolytic solution can operate in a wider voltage window, thereby achieving a higher energy density. In some embodiments, the nonaqueous electrolytic solution may include an organic solvent, a lithium salt, and an additive.

In some embodiments, the electrolytic solution according to this application includes lithium difluorophosphate ($LiPO_2F_2$). In a first charge-and-discharge cycle of the electrochemical device, a chemical reaction occurs between the electrolytic solution and the positive active material to form a stable solid electrolyte interface (SEI) film on the surface of the positive electrode. The added lithium difluorophosphate increases the LiF content in the SEI film to enhance stability of the SEI film. In some embodiments, based on the total mass of the electrolytic solution, a weight percent of the lithium difluorophosphate is 0.001% to 2%. In some embodiments, based on the total mass of the electrolytic solution, the weight percent of the lithium difluorophosphate is 0.001% to 1%. In some embodiments, based on the total mass of the electrolytic solution, the weight percent of the lithium difluorophosphate is 0.001% to 0.5%.

In some embodiments, the electrolytic solution according to this application further includes a sulfur-containing additive. The sulfur-containing additive can form a stable SEI film on the surface of the positive electrode to strengthen protection for the positive electrode and improve the cycle stability of the electrochemical device. In some embodiments, the sulfur-containing additive includes 1,3-propane sultone (PS). Based on the total mass of the electrolytic solution, a weight percent of the 1,3-propane sultone is 0.01% to 3%.

In some embodiments, the electrolytic solution according to this application further includes a polynitrile compound. The polynitrile compound includes at least one of or is at least one selected from glutaronitrile, adiponitrile, 1,3,5-glutaronitrile, 1,2,3-propanetricarbonitrile, 1,3,6-hexamethylenetricarbonitrile, 1,2,6-hexamethylenetricarbonitrile, 1,2,3-tris(2-cyanoethoxy)propane, 1,2,4-tris(2-cyano ethoxy) butane, 1,1,1-tris(cyanoethoxymethylene)ethane, 1,1,1-tris (cyanoethoxymethylene)propane, 3-methyl 1,3,5-tris (cyanoethoxy)pentane, 1,2,7-tris(cyanoethoxy)heptane, 1,2, 6-tris(cyanoethoxy)hexane, or 1,2,5-tris(cyanoethoxy) pentane. In some embodiments, based on the total mass of the electrolytic solution, a weight percent of the polynitrile compound is 0.01% to 10%.

In some embodiments, the organic solvent in the electrolytic solution according to this application includes at least one of or is at least one selected from: ethylene carbonate, propylene carbonate, diethyl carbonate, ethyl methyl carbonate, or dimethyl carbonate. As another improvement made to this application, in some embodiments, the organic solvent in the electrolytic solution includes ethyl methyl carbonate (EMC) and dimethyl carbonate (DMC). Based on the total mass of the electrolytic solution, the weight percent of the EMC and DMC is not greater than 20%. In such embodiments, the electrolytic solution can interact with the positive active material according to this application to effectively reduce the gassing amount of the electrochemical device in a high-temperature environment, improve the safety performance of the electrochemical device, and improve the cyclic stability of the electrochemical device.

In some embodiments, the lithium salt in the electrolytic solution according to this application includes at least one of or is at least one selected from: lithium hexafluorophosphate ($LiPF_6$), lithium bistrifluoromethanesulfonimide LiN $(CF_3SO_2)_2$ (LiTFSI for short), lithium bis(fluorosulfonyl) imide $Li(N(SO_2F)_2)$ (LiFSI for short), lithium bis(oxalate) borate $LiB(C_2O_4)_2$ (LiBOB for short), lithium tetrafluorophosphate oxalate ($LiPF_4C_2O_2$), lithium difluoro (oxalate)borate $LiBF_2(C_2O_4)$ (LiDFOB for short), or lithium hexafluorocesium oxide ($LiCsF_6$).

In some embodiments, the electrochemical device according to this application further includes a separator disposed between the positive electrode and the negative electrode to prevent a short circuit. The material and the shape of the separator used in the electrochemical device in this application are not particularly limited, and may be any material and shape disclosed in the prior art. In some embodiments, the separator includes a polymer or an inorganic compound or the like formed from a material that is stable to the electrolytic solution herein.

In some embodiments, the separator may include a substrate layer and a surface treatment layer. In some embodiments, the substrate layer is a non-woven fabric, film, or composite film, which, in each case, are in a porous structure. In some embodiments, the material of the substrate layer may include at least one of or is at least one selected from polyethylene, polypropylene, polyethylene terephthalate, or polyimide. In some embodiments, the substrate layer may be a polyethylene porous film, a polypropylene porous film, a polyethylene non-woven fabric, a polypropylene non-woven fabric, or a polypropylene-polyethylene-polypropylene porous composite film.

In some embodiments, the surface treatment layer may be, but without being limited to, a polymer layer, an inorganic layer, or a hybrid layer of a polymer and an inorganic compound.

The inorganic compound layer may include inorganic particles and a binder. In some embodiments, the inorganic particles may include one or more of or may be a combination of one or more selected from aluminum oxide, silicon oxide, magnesium oxide, titanium oxide, hafnium dioxide, tin oxide, ceria, nickel oxide, zinc oxide, calcium oxide, zirconium oxide, yttrium oxide, silicon carbide, boehmite, aluminum hydroxide, magnesium hydroxide, calcium hydroxide, or barium sulfate. In some embodiments, the binder may include one or more of or may be a combination of one or more selected from polyvinylidene fluoride, poly(vinylidene fluoride-co-hexafluoropropylene), polyamide, polyacrylonitrile, polyacrylate, polyacrylic acid, polyacrylate, polyvinylpyrrolidone, polyvinyl ether, poly methyl methacrylate, polytetrafluoroethylene, or polyhexafluoropropylene.

The polymer layer may include a polymer. In some embodiments, the material of the polymer may include or be selected from at least one of a polyamide, a polyacrylonitrile, an acrylate polymer, a polyacrylic acid, a polyacrylate, a polyvinylpyrrolidone, a polyvinyl ether, a polyvinylidene fluoride, or a poly(vinylidene fluoride-hexafluoropropylene).

A person skilled in the art understands that the electrochemical device according to this application may be a lithium-ion battery or any other appropriate electrochemical device. To the extent not departing from the content disclosed herein, the electrochemical device according the embodiments of this application includes any device in which an electrochemical reaction occurs. Specific examples of the electrochemical device include all kinds of primary batteries, secondary batteries, solar batteries, or capacitors. Especially, the electrochemical device is a lithium secondary battery, including a lithium metal secondary battery, a lithium-ion secondary battery, a lithium polymer secondary battery, or a lithium-ion polymer secondary battery.

II. Applications

The use of the electrochemical device according to this application is not particularly limited, and the electrochemical device may be used for any purposes known in the prior art. According to some embodiments of this application, the electrochemical device according to this application is applicable to an electronic device. The electronic device includes, but is not limited to, a notebook computer, a pen-inputting computer, a mobile computer, an e-book player, a portable phone, a portable fax machine, a portable photocopier, a portable printer, a stereo headset, a video recorder, a liquid crystal display television set, a handheld cleaner, a portable CD player, a mini CD-ROM, a transceiver, an electronic notepad, a calculator, a memory card, a portable voice recorder, a radio, a backup power supply, a motor, a car, a motorcycle, a power-assisted bicycle, a bicycle, a lighting appliance, a toy, a game console, a watch, an electric tool, a flashlight, a camera, a large household battery, a lithium-ion capacitor, and the like.

By using a lithium-ion battery as an example, the following further describes the technical solutions of this application with reference to but without being limited to comparative embodiments and embodiments. A person skilled in the art understands that the preparation method described herein is merely illustrative. Any modifications and equivalent replacements made to the technical solutions of this application without departing from the scope of the technical solutions of this application still fall within the protection scope of this application.

III. Embodiments

Preparing a Lithium-Ion Battery

According to the following method, a lithium-ion full battery is prepared by using the positive active material disclosed in the embodiments and comparative embodiments.

(1) Preparing a positive electrode: Mixing well the positive active material prepared in the following embodiments and comparative embodiments, conductive agent acetylene black, and binder polyvinylidene difluoride (PVDF) at a weight ratio of 94:3:3 in N-methyl-pyrrolidone to prepare a positive slurry, coating a positive current collector aluminum foil with the obtained positive slurry evenly, drying the aluminum foil at 85° C. and performing cold-pressing to obtain a positive active material layer, and then performing slitting and cutting, and welding a positive tab to obtain a positive electrode.

(2) Preparing a negative electrode: Mixing well artificial graphite, styrene butadiene rubber (SBR), and sodium carboxymethyl cellulose (CMC) at a weight ratio of 97:2:1 in deionized water to make a negative slurry, coating a negative current collector copper foil with the negative slurry evenly, and drying the copper foil at 85° C. to form a negative active material layer, and then performing cold-pressing, slitting, cutting, and welding a negative tab to obtain a negative electrode.

(3) Preparing an electrolytic solution: Mixing well ethylene carbonate (EC), propylene carbonate (PC), ethyl methyl carbonate (EMC), and diethyl carbonate (DEC) in a dry argon atmosphere glovebox at a weight ratio of EC:PC:EMC:DEC=15:15:30:40, adding 3 wt % fluoroethylene carbonate (FEC), 1.5 wt % 1,3-propane sultone (PS), 1 wt % 1,3,6-hexanetricarbonitrile, dissolving and fully stirring the mixture, and then adding a lithium salt $LiPF_6$, and mixing well to obtain an electrolytic solution. The concentration of $LiPF_6$ is 1.10 mol/L. The weight percent of a material in the electrolytic solution is a weight percent of the material based on a total weight of the electrolytic solution.

(4) Preparing a separator: Using a polyethylene (PE) porous polymer film as a separator.

(5) Assembling a lithium-ion battery: Stacking the positive electrode, the separator, and the negative electrode in sequence, placing the separator between the positive electrode and the negative electrode to serve a function of separation, winding the stacked structure, putting the structure into an aluminum plastic film package, injecting the prepared electrolytic solution, sealing the package, and then performing chemical formation to form a final lithium-ion battery.

Method for Measuring Circularity and Cross-Sectional Area of a Particle

Measuring the circularity of the positive active material particles by using a DTP-550A circularity meter.

Analyzing the median diameter $D_{v50}$ of the positive active material particles by using a laser particle size method with reference to the standard GB/T19077-2016. Calculating the cross-sectional area of a positive active material particle by using the median diameter.

Measuring a Powder Resistivity

Measuring the powder resistivity of the positive active material with an FT-361FM low-resistance four-point-probe powder resistivity meter by applying a pressure of 5000 kg.

Determining an Area Percent of Broken Polycrystalline Particles

Cutting the positive electrode along a direction perpendicular to the positive current collector by using an ion beam cross section polisher (model: JEOL-IB-09010CP), so as to obtain a cross section. Observing the cross section by using a scanning electron microscope at an appropriate magnification. Taking an image in a backscatter diffraction mode. Recognizing the particles A, the broken particles in the particles A, and the current collector by using the morphology recognition function of the Image J software, and calculating the corresponding areas. The total area of the cross section of the positive electrode plate is S, the total area of the particles A is $S_1$ (including the broken particles), the total area of the broken particles in the particles A is $S_2$, the area of the positive current collector is $S_3$, and a porosity is P. The area percent of the conductive agent and the binder is ignored. In this application, the circularity of the particle A is greater than or equal to 0.4, and the cross-sectional area of a single particle A is greater than or equal to 20 μm².

Total area percent of the particles $A$ in the total area of the cross section=$S_1/S \times 100\%$;

Total area percent of broken particles of the particles $A$ in the total area of the cross section=$S_2/S \times 100\%$;

Total area percent of broken particles in the total area of the particles $A$=$S_2/S_1 \times 100\%$; and Total area percent of the particles $B$ in the total area of the cross section=$(S-S_1-S_3)/S \times 100\% - P$.

Determining a Porosity of the Positive Active Material Layer

Determining the porosity P of the positive active material layer by using a gas replacement method according to a formula: $P=(V-V_0)/V \times 100\%$, $V_0$ is a true volume, V is an apparent volume, with reference to the standard GB/T 24586-2009 *Determination of Apparent Density, True Density and Porosity of Iron Ores*.

Thermogravimetric-Mass Spectrometry (TG-MS) Test

Determining the position of the oxygen release peak and the amount of released oxygen of the positive active material by using a thermogravimetric analyzer together with a mass spectrometer with reference to the standards ASTM D3418-15, GB/T 13464-2008, and GB/T 6041-2002.

Measuring a BET Specific Surface Area

Measuring the specific surface area of the positive active material in the embodiments and comparative embodiments by a nitrogen adsorption/desorption method by using a specific surface area analyzer (Tristar II 3020M) with reference to the standard GB/T 19587-2017.

Determining a Median Diameter $D_{v50}$

Performing a particle size distribution test on the positive active materials in the embodiments and comparative embodiments with a Malvern particle size analyzer to obtain the median diameter $D_{v50}$ of the positive active material with reference to the standard GB/T19077-2016.

Measuring a Compacted Density of the Positive Electrode

Calculating the compacted density by dividing a unit mass of the active material by a unit volume. Weighing specimens of a current collector and a positive electrode plate with an electronic scale, where the area of the specimen is A, and the weights of the specimens are $M_1$ and $M_2$ respectively. Measuring the thicknesses of the current collector and the positive electrode plate with a high-precision micrometer, denoted by $C_1$ and $C_2$ respectively. Compacted density of the positive electrode=$[(M_2-M_1)/(C_2-C_1)]/A$ Measuring a Deformation Rate of the Positive Current Collector Cutting the positive electrode along a direction perpendicular to the positive current collector by using an ion beam cross section polisher (model: JEOL-IB-09010CP), so as to obtain a cross section. Observing the cross section with a scanning electron microscope at an appropriate magnification, and measuring the thickness d of the undeformed part of the positive current collector in the thickness direction by using a gauge of the scanning electron microscope.

Calculating the deformation rate of the positive current collector according to the following calculation formula: (inherent thickness of the positive current collector–d)/ inherent thickness of the positive current collector×100%.

When the positive electrode contains a region uncoated with the positive active material layer, the inherent thickness of the positive current collector is the thickness of the current collector in the region uncoated with the positive active material layer in the positive electrode.

When the positive electrode contains no region uncoated with the positive active material layer, the inherent thickness of the positive current collector is the thickness of the current collector before the positive electrode is cold-pressed.

Scanning Electron Microscope (SEM) Test

Using a scanning electron microscope (SEM) to test the positive active material powder. Observing the morphology of the positive active material at an appropriate magnification, and analyzing element distribution of the specimen by using a matched X-ray energy spectrometer.

Measuring a Thickness Expansion Rate of a Lithium-Ion Battery Stored at a High Temperature Storing the lithium-ion battery in each embodiment and comparative embodiment in a 25° C. constant-temperature environment for 24 hours, and measuring the thickness $L_1$ of the lithium-ion battery by using a micrometer. Subsequently, storing the same lithium-ion battery in an 85° C. thermostat for 12 hours, and measuring the thickness $L_2$ of the lithium-ion battery by using the micrometer. Dividing $(L_2-L_1)$ by $L_1$ to obtain a ratio as a thickness expansion rate of the lithium-ion battery stored at a high temperature.

Testing the Lithium-Ion Battery Subjected to Charge-and-Discharge Cycles at 45° C.

Performing the following steps to charge and discharge a lithium-ion battery in the comparative embodiments and embodiments of this application, and calculating a cycle capacity retention rate of the lithium-ion battery.

Performing a first charge-and-discharge cycle in an 45° C. environment first. Charging the lithium-ion battery at a constant current of 0.5 C until the voltage reaches an upper limit of 4.25 V. and then charging the battery at a constant voltage. Subsequently, discharging the lithium-ion battery at a constant current of 0.5 C until the voltage reaches a cut-off voltage of 2.8 V, and recording a first-cycle discharge capacity $C_1$. Subsequently, repeating the foregoing charge and discharge process for 300 cycles, and recording a $300^{th}$-cycle discharge capacity as $C_{300}$.

Using the following formula to calculate the cycle capacity retention rate of the lithium-ion battery: $(C_{300}/C_1) \times 100\%$.

The following describes in detail the specific implementation of the positive active material provided in this application.

Embodiments 1 to 16 and Comparative Embodiments 1 to 4

Embodiment 1 to Embodiment 8

At a stoichiometric ratio indicated in $LiNi_{0.88}Co_{0.09}Mn_{0.028}Al_{0.001}Zr_{0.002}O_2$, preparing a $Ni_{0.88}Co_{0.09}Mn_{0.028}$ $(OH)_2$ precursor with a $D_{v50}$ of 12 μm, lithium hydroxide, and nanoscale $Al_2O_3$. Grinding them evenly, calcining them at 740° C. for 12 hours, and then grinding and sifting the calcined product to obtain a polycrystalline material with a $D_{v50}$ of 12 μm.

At a stoichiometric ratio indicated in $LiNi_{0.88}Co_{0.09}Mn_{0.028}Al_{0.001}Zr_{0.002}O_2$, preparing a precursor with a $D_{v50}$ of 4 μm, lithium hydroxide, nanoscale $Al_1O_3$, and $ZrO_2$, and grinding them evenly. Calcining them at 780° C. for 14 hours, and then grinding and sifting the calcined product to obtain a quasi-monocrystalline material with a $D_{v50}$ of 2.5 μm.

Mixing the polycrystalline material and the quasi-monocrystalline material at a given weight ratio to obtain the positive active material according to Embodiment 1 of this application.

Embodiments 2 to 8 differ from Embodiment 1 in the weight ratio between the particles A and the particles B added in the positive active material. The weights of the particles A and the particles B may be reflected by the total area percent of the particles A and the total area percent of the particles B in Table 1 below.

Embodiment 9 to Embodiment 11

Embodiments 9 to 11 differ from Embodiment 1 in that the positive active material in Embodiments 9 to 11 is $LiNi_{0.88}Co_{0.09}Mn_{0.03}O_2$. The particles A and the particles B mixed at a different weight ratio are added into the positive active materials in Embodiments 9 to 11 separately. The weights of the particles A and the particles B may be reflected by the total area percent of the particles A and the total area percent of the particles B in Table 1 below.

Embodiment 12

Embodiment 12 differs from Embodiment 1 in that the doping element in Embodiment 1 is replaced with element Ti.

Embodiment 13

Embodiment 13 differs from Embodiment 1 in that the doping element in Embodiment 1 is replaced with element W.

Embodiment 14

Embodiment 14 differs from Embodiment 1 in that the doping element in Embodiment 1 is replaced with element Zr.

Embodiment 15

Embodiment 15 differs from Embodiment 1 in that the doping element in Embodiment 1 is replaced with element Y.

Embodiment 16

Embodiment 16 differs from Embodiment 1 in that the doping element in Embodiment 1 is replaced with element Al.

Comparative Embodiments 1 to 4

Comparative Embodiment 1 differs from Embodiment 1 in that the particles B alone in Embodiment 1 are used as a positive active material.

Comparative Embodiment 2 differs from Embodiment 1 in that the particles A alone in Embodiment 1 are used as a positive active material.

Comparative Embodiments 3 and 4 differ from Embodiment 1 in the weight ratio between the particles A and the particles B added in the positive active material. The weights of the particles A and the particles B may be reflected by the total area percent of the particles A in the total area of the cross section and the total area percent of the particles B in the total area of the cross section in Table 1 below.

Table 1 to Table 3 below list the structural parameter information of the positive active materials obtained in Embodiments 1 to 16 and Comparative Embodiments 1 to 4 as well as electrochemical performance of the electrochemical devices. The total area of the particles A and the total area of the particles B in the tables are adjusted by controlling the weight ratio between the particles A and the particles B.

As shown in the data in Table 1, in contrast to Comparative Embodiments 1 to 4, the thickness expansion rate and electrochemical cycle performance of the electrochemical devices in Embodiment 1 to 11 in a high-temperature storage environment are improved by adding a mixture of the particles A (polycrystalline) and the particles B (monocrystalline) in the positive active material and by controlling the ratio of the total area percent of the particles A to the total area percent of the particles B to fall within the range of 1:9 to 8:2.

As shown in the data in Table 1, the overall electrochemical data of Embodiments 9 to 11 is slightly worse than that of Embodiments 1 to 8. This is because, in contrast to Embodiments 9 to 11, the positive active materials in Embodiments 1 to 8 are doped with elements. The doping elements serve to stabilize oxygen in the materials, reduce the release of oxygen, and in turn, reduce oxidation of the electrolytic solution by the oxygen, thereby achieving the purpose of reducing the gassing amount.

As shown in the data of Embodiments 1 to 5 in Table 2, by adjusting the total area percent of the particles A and the total area percent of the particles B, especially by controlling the total area percent of the particles A to be 32% or less, this application can significantly improve the aluminum foil deformation rate and the particle breakage rate, and further improve the thickness expansion rate and electrochemical cycle performance of the electrochemical device under high-temperature storage conditions.

Embodiments 12 to 16 differ from Embodiment 1 in the doping element. The breakage rate of the polycrystalline particles in the positive active material layer and the aluminum foil deformation rate in Embodiments 12 to 16 are kept as low as those in Embodiment 1, without deteriorating the thickness expansion rate and electrochemical cycle performance of the electrochemical device under high-temperature storage conditions.

In addition, as can be seen from the data in Table 3, all the powder resistivities of the polycrystalline particles A used in Embodiments 1 to 16 are 6 $\Omega \cdot cm$ to 10 $\Omega \cdot cm$, and all the powder resistivities of the quasi-monocrystalline particles B used in Embodiments 1 to 16 are 20 $\Omega \cdot cm$ to 40 $\Omega \cdot cm$. As shown in a TG-MS test, the positive active materials in Embodiments 1 to 16 produce an oxygen release peak at 230° C. to 245° C.

TABLE 1

| | Total area percent of particles A | Total area percent of particles B | Ratio of total area percent of particles A to total area percent of particles B | Thickness expansion rate after storage at 85° C. | Cycle capacity retention rate |
|---|---|---|---|---|---|
| Embodiment 1 | 42.4% | 21.6% | 1.96 | 35.00% | 86.53% |
| Embodiment 2 | 31.5% | 34.9% | 0.90 | 17.80% | 90.98% |
| Embodiment 3 | 26.4% | 40.0% | 0.55 | 14.80% | 91.30% |
| Embodiment 4 | 20.5% | 47.0% | 0.44 | 12.88% | 91.57% |
| Embodiment 5 | 12.5% | 54.6% | 0.23 | 12.64% | 92.13% |
| Embodiment 6 | 36.6% | 30.1% | 1.22 | 18.10% | 90.01% |
| Embodiment 7 | 49.2% | 12.4% | 3.97 | 34.70% | 82.72% |
| Embodiment 8 | 6.7% | 60.2% | 0.11 | 12.05% | 87.92% |
| Embodiment 9 | 39.7% | 24.5% | 1.62 | 34.80% | 88.60% |
| Embodiment 10 | 27.3% | 38.4% | 0.71 | 22.70% | 88.98% |
| Embodiment 11 | 18.7% | 46.2% | 0.40 | 20.21% | 88.46% |
| Comparative Embodiment 1 | 0.0% | 67.5% | 0.00 | 35.90% | 40.86% |
| Comparative Embodiment 2 | 61.70% | 0.0% | | 55.12% | 50.34% |
| Comparative Embodiment 3 | 5.10% | 61.3% | 0.08 | 36.80% | 45.86% |
| Comparative Embodiment 4 | 5.50% | 60.70% | 0.09 | 40.70% | 53.42% |

TABLE 2

| | Total area percent of particles A | Area percent of broken particles in total area of particles A | Area percent of broken particles in total area of cross section | Area percent of alminum foil | Porosity | Deformation rate of aluminum foil | Thickness expansion rate after storage at 85° C. | Cycle capacity retention rate |
|---|---|---|---|---|---|---|---|---|
| Embodiment 1 | 42.4% | 23.45% | 9.94% | 14.21% | 20.40% | 30.64% | 35 00% | 86.53% |
| Embodiment 2 | 31.5% | 12.7% | 4.00% | 14.13% | 19.8% | 27.3% | 17.50% | 90.98% |
| Embodiment 3 | 26.4% | 4.10% | 1.08% | 13.52% | 20.09% | 25.15% | 14.80% | 91.30% |
| Embodiment 4 | 20.5% | 3.30% | 0.68% | 14.21% | 19.42% | 16.67% | 12.88% | 91.57% |
| Embodiment 5 | 12.5% | 3.15% | 0.39% | 13.47% | 19.03% | 4.17% | 12.64% | 92.13% |
| Embodiment 12 | 41.5% | 22.30% | 9.25% | 13.64% | 22.19% | 30.51% | 39.20% | 80.36% |
| Embodiment 13 | 41.6% | 24.02% | 10% | 14.01% | 21.57% | 32.18% | 41.30% | 81.56% |
| Embodiment 14 | 42.6% | 23.76% | 10.10% | 13.87% | 21.78% | 31.54% | 43.19% | 80.89% |
| Embodiment 15 | 42.7% | 22.89% | 9.77% | 14.10% | 22.05% | 31.82% | 38.92% | 80.35% |
| Embodiment 16 | 42.4% | 23.4% | 9.92% | 13.81% | 21.40% | 31.47% | 37.80% | 82.90% |
| Comparative Embodiment 2 | 61.70% | 56.8% | 35.0% | 13.49% | 23.4% | 35.8% | 55.12% | 50.34% |

TABLE 3

| | Resistivity of particle A ($\Omega \cdot cm$) | Resistivity of particle B ($\Omega \cdot cm$) | BET specific surface area of particle A ($m^2/g$) | BET specific surface area of particle A ($m^2/g$) | Cross-sectional area of particle A with diameter of $D_{v50}$ ($\mu m^2$) | Cross-sectional area of particle B with diameter of $D_{v50}$ ($\mu m^2$) | Location of oxygen release peak (° C.) |
|---|---|---|---|---|---|---|---|
| Embodiment 1 | 8.3 | 25.9 | 0.42 | 0.93 | 117.6 | 5.9 | 237 |
| Embodiment 12 | 8.2 | 26.8 | 0.43 | 0.91 | 119.5 | 6.4 | 239 |
| Embodiment 13 | 8.1 | 25.4 | 0.43 | 0.88 | 112.3 | 4.2 | 236 |
| Embodiment 14 | 8.3 | 26.9 | 0.42 | 0.74 | 114.6 | 7,3 | 234.6 |
| Embodiment 15 | 8.4 | 27,1 | 0.41 | 0.75 | 116.5 | 6.8 | 234.6 |
| Embodiment 16 | 8.4 | 25.6 | 0.42 | 0,85 | 113.8 | 5.5 | 243.8 |
| Comparative Embodiment 4 | 8.1 | 27.6 | 0,41 | 0,85 | 116.5 | 5.5 | 230 |

Embodiments 17 to 19

Embodiments 17 to 19 correspond to Embodiment 5, but differ from Embodiment 5 in the weight ratio between the active material, the conductive agent, and the PVDF, as detailed in Table 4 below.

The first functional layer and the second functional layer in Embodiment 24 are formed by: mixing well $LiFe_{0.442}Mn_{0.558}PO_4$, conductive agent acetylene black, and binder polyvinylidene difluoride (PVDF) at a weight ratio of 96:2.5:1.5 in an N-methyl-pyrrolidone solvent system to make a slurry, and applying the slurry.

| Embodiments | Area percent of particles A | Components of first functional layer | Thickness of first functional layer | Components of second, functional layer | Thickness of second functional layer |
|---|---|---|---|---|---|
| Embodiment 5 | 12.5% | / | / | / | / |
| Embodiment 20 | 14.82% | Particles B | 10 μm | / | / |
| Embodiment 21 | 14.71% | / | / | Particles B | 10 μm |
| Embodiment 22 | 13.30% | Particles B | 5 μm | Crystalline particles B | 5 μm |
| Embodiment 23 | 13.50% | $LiFePO_4$ ($D_{v50}$ = 1.05 μm) | 5 μm | $LiFePO_4$ ($D_{v50}$ = 1.05) | 5 μm |
| Embodiment 24 | 13.20% | $LiFe_{0.442}Mn_{0.558}PO_4$ ($D_{v50}$ = 0.82 μm) | 5 μm | $LiFe_{0.442}Mn_{0.558}PO_4$ ($D_{v50}$ = 0.82 μm) | 5 μm |
| Comparative Embodiment 2 | 61.7% | / | / | / | / |

TABLE 4

| Embodiments | Active material: conductive agent: PVDF | Thickness expansion rate after storage at 85° C. | Cycle capacity retention rate |
|---|---|---|---|
| Embodiment 17 | 93:3.5:3.5 | 10.74% | 92.58% |
| Embodiment 5 | 94:3:3 | 12.64% | 92.13% |
| Embodiment 18 | 96:2.5:1.5 | 15.88% | 89.15% |
| Embodiment 19 | 97:1.5:1.5 | 20.98% | 86.57% |

TABLE 5-2

| Embodiments | Deformation rate of aluminum foil (%) | Breakage percent of particles (%) | Thickness expansion rate after storage at 85° C. | Cycle capacity retention rate |
|---|---|---|---|---|
| Embodiment 5 | 4.17% | 3.15% | 12.64% | 92.13% |
| Embodiment 20 | 1.17% | 3.57% | 10.93% | 89.77% |
| Embodiment 21 | 1.52% | 1.50% | 10.58% | 90.18% |
| Embodiment 22 | 1.15% | 1.40% | 8.80% | 92.84% |
| Embodiment 23 | 1.08% | 1.30% | 8.53% | 92.91% |
| Embodiment 24 | 1.12% | 1.39% | 9.02% | 92.59% |
| Comparative Embodiment 2 | 35.8% | 35.0% | 55.12% | 50.34% |

As shown in the data in Table 4, by controlling the weight percent of the binder PVDF in the positive active material layer to fall within the given range, the corresponding electrochemical device exhibits excellent electrochemical performance, especially exhibits a low thickness expansion rate and a high cycle capacity retention rate under high-temperature storage conditions.

Embodiments 20 to 24

Embodiments 20 to 24 correspond to Embodiment 5. Embodiments 21 to 24 differ from Embodiment 5 in that a first functional layer and/or a second functional layer is further added in the positive electrode. The first functional layer is disposed between the positive active material layer and the positive current collector, and the second functional layer is disposed on the surface of the positive active material layer.

The first functional layer and the second functional layer in Embodiments 20 to 22 are formed by: mixing well the particles B prepared in Embodiment 5, conductive agent acetylene black, and binder polyvinylidene difluoride (PVDF) at a weight ratio of 96:2.5:1.5 in an N-methyl-pyrrolidone solvent system to make a slurry, and applying the slurry.

The first functional layer and the second functional layer in Embodiment 23 are formed by: mixing well $LiFePO_4$, conductive agent acetylene black, and binder polyvinylidene difluoride (PVDF) at a weight ratio of 96:2.5:1.5 in an N-methyl-pyrolidone solvent system to make a slurry, and applying the slurry.

As shown in the data in Table 5-2, in contrast to Comparative Embodiment 2, the aluminum foil deformation rate, particle breakage rate, and thickness expansion rate after storage at a high temperature in Embodiment 5 and Embodiments 20 to 24 are significantly lower than those in Comparative Embodiment 2, and the cycle capacity retention rate is higher than that in Comparative Embodiment 2.

Moreover, in contrast to Embodiment 5, the aluminum foil deformation rate in Embodiments 20 to 24 is further reduced, the particle breakage rate and thickness expansion rate after storage at a high temperature are further reduced, and the cycle capacity retention rate is further improved. This shows that the materials in the first functional layer and/or the second functional layer serve a good cushioning effect to protect the positive current collector and ensure that the polycrystalline particles A in the positive active material layer are not prone to break during electrode preparation (especially cold-pressing) and charge-and-discharge cycles of the electrochemical device.

Embodiments 25 to 29

Embodiments 25 to 29 differ from Embodiment 5 in that the ingredients of the electrolytic solution are adjusted. The corresponding ingredients added in the electrolytic solution and the weight percent thereof are shown in Table 6.

As shown in the electrochemical data in Embodiments 25 to 29 versus Embodiment 5, the electrochemical performance of the resulting electrochemical device exhibits excellent electrochemical performance after the original electrolytic solution is doped with 1,3-propane sultone (PS) at a weight percent of 3 wt % or less, lithium difluorophosphate at a weight percent of 1 wt % or less, a polynitrile compound at a weight percent of 4 wt % or less, and fluoroethylene carbonate (FEC) at a weight percent of 5 wt % or less, or any combination thereof.

TABLE 6

| Embodiments | Material added and weight percent | Thickness expansion rate after storage at 85° C. | Cycle capacity retention rate |
|---|---|---|---|
| Embodiment 25 | 3% FEC + 1% PS + 0.45% lithium difluorophosphate | 18.27% | 89.67% |
| Embodiment 26 | 3% FEC + 0.9% PS + 0.45% lithium difluorophosphate + 1% 1,3,6-hexanetricarbonitrile | 10.33% | 93.13% |
| Embodiment 27 | 4% FEC + 1% PS + 1% 1,3,6-hexanetricarbonitrile | 12.25% | 93.05% |
| Embodiment 28 | 3% FEC + 0.5% PS + 2% 1,3,6-hexanetricarbonitrile | 13.46% | 91.37% |
| Embodiment 29 | 3% FEC + 0.5% PS + 0.45% lithium difluorophosphate + 1.5% 1,3,6-hexanetricarbonitrile | 11.32% | 93.63% |
| Embodiment 5 | 3% FEC + 1.5% PS + 1% 1,3,6-hexanetricarbonitrile | 12.64% | 92.13% |

References to "embodiments", "some embodiments", "an embodiment", "another example", "example", "specific example" or "some examples" throughout the specification mean that at least one embodiment or example in this application includes specific features, structures, materials, or characteristics described in the embodiment(s) or example(s). Therefore, descriptions throughout the specification, which make references by using expressions such as "in some embodiments", "in an embodiment", "in one embodiment", "in another example", "in an example", "in a specific example", or "example", do not necessarily refer to the same embodiment or example in this application. In addition, specific features, structures, materials, or characteristics herein may be combined in one or more embodiments or examples in any appropriate manner.

Although illustrative embodiments have been demonstrated and described above, a person skilled in the art understands that the above embodiments are not to be construed as a limitation on this application, and changes, replacements, and modifications may be made to the embodiments without departing from the spirit, principles, and scope of this application.

What is claimed is:

1. An electrochemical device, comprising: a positive electrode, wherein the positive electrode comprises a positive current collector and a positive active material layer, the positive active material layer comprises particles A and particles B, a circularity of a particle A is $R_A$, a cross-sectional area of the particle A is $S_A$; a circularity of a particle B is $R_B$, a cross-sectional area of the particle B is $S_B$, wherein $R_B<0.4\leq R_A$ and $S_B<20~\mu m^2\leq S_A$; based on a total area of a cross section of the positive electrode in a direction perpendicular to the positive current collector, a ratio of a total area percent of the particles A to a total area percent of the particles B is 1:9 to 8:2; and, the particles A and the particles B are mixed together in the same positive active material layer.

2. The electrochemical device according to claim 1, wherein the particles A satisfy at least one of the conditions (a) to (c):

(a) based on the total area of the cross section of the positive electrode in the direction perpendicular to the positive current collector, the total area percent of the particles A is 5% to 50%;

(b) a resistivity of the particle A is 6 Ω·cm to 10 Ω·cm; and (c) the particle A comprises a compound represented by a formula $Li_{1+a}Ni_xMn_yCo_zM_mO_2$, wherein $-0.05\leq a<0.3$, $0.8\leq x<1$, $0<y\leq 0.2$, $0<z\leq 0.2$, $0<m<0.2$, and the element Mis one or more selected from the group consisting of Al, Ti, W, Zr, Nb, In, Ru, Sb, Sr and Y.

3. The electrochemical device according to claim 1, wherein the particles A comprise broken particles, and the broken particles satisfy at least one of the conditions (d) to (e):

(d) based on the total area of the cross section of the positive electrode in the direction perpendicular to the positive current collector, a total area percent of the broken particles is not greater than 15%; and (e) based on a total area of the particles A, the total area percent of the broken particles is not greater than 30%.

4. The electrochemical device according to claim 1, wherein the particles B satisfy at least one of the conditions (f) to (h):

(f) based on the total area of the cross section of the positive electrode in the direction perpendicular to the positive current collector, the total area percent of the particles B is 5% to 60%;

(g) a resistivity of the particle B is 20 Ω·cm to 40 Ω·cm; and (h) the particle B comprises a compound represented by a formula $Li_{1+a}Ni_xMn_yCo_zM_mO_2$, wherein $-0.05\leq a<0.3$, $0.8\leq x<1$, $0<y\leq 0.2$, $0<z\leq 0.2$, $0<m<0.2$, and the element Mis one or more selected from the group consisting of Al, Ti, W, Zr, Nb, In, Ru, Sb, Sr and Y.

5. The electrochemical device according to claim 1, wherein the positive active material layer satisfies at least one of the conditions (i) to (j):

(i) a porosity of the positive active material layer is less than or equal to 25%; and (j) in a TG-MS test, a positive active material of the positive active material layer produces an oxygen release peak at 230° C. to 245° C.

6. The electrochemical device according to claim 1, wherein the ratio of the total area percent of the particles A to the total area percent of the particles B is 0.23 to 1.22.

7. The electrochemical device according to claim 1, wherein the positive active material layer further comprises a binder and a conductive agent, and, based on a total mass of the positive active material layer, a weight percent of the binder is 1.25% to 5%.

8. The electrochemical device according to claim 1, wherein the positive electrode further comprises a functional layer, and the functional layer is disposed on the positive active material layer and/or disposed between the positive active material layer and the positive current collector.

9. The electrochemical device according to claim 8, wherein the functional layer satisfies at least one of the conditions (1) to (4):

(1) the functional layer is disposed on the positive active material layer, the positive active material layer is disposed on the positive current collector, and a ratio of a thickness of the positive active material layer to a thickness of the functional layer is 99:1 to 50:50;

(2) the functional layer is disposed between the positive active material layer and the positive current collector, and the ratio of the thickness of the positive active material layer to the thickness of the functional layer is 99:1 to 50:50;

(3) the functional layer is disposed on the positive active material layer, the functional layer is disposed between the positive active material layer and the positive current collector, and the ratio of the thickness of the positive active material layer to the thickness of the functional layer is 99:1 to 50:50; and (4) the functional layer comprises a material C, the material C comprises at least one of lithium cobalt oxide, lithium iron phosphate, lithium manganese iron phosphate, or lithium manganese oxide, and a particle diameter $D_{v50}$ of the material C is 0.5 μm to 6 μm.

10. The electrochemical device according to claim 1, wherein a deformation rate of the positive current collector is less than or equal to 32%.

11. An electronic device, comprising an electrochemical device, wherein the electrochemical device comprises a positive electrode, wherein the positive electrode comprises a positive current collector and a positive active material layer, the positive active material layer comprises particles A and particles B, a circularity of a particle A is $R_A$, a cross-sectional area of the particle A is $S_A$; a circularity of a particle B is $R_B$, a cross-sectional area of the particle B is $S_B$, wherein $R_B<0.4≤R_A$ and $S_B<20$ μm²$<S_A$; based on a total area of a cross section of the positive electrode in a direction perpendicular to the positive current collector, a ratio of a total area percent of the particles A to a total area percent of the particles B is 1:9 to 8:2; and, the particles A and the particles B are mixed together in the same positive active material layer.

12. The electronic device according to claim 11, wherein the particles A satisfy at least one of the conditions (a) to (c):

(a) based on the total area of the cross section of the positive electrode in the direction perpendicular to the positive current collector, the total area percent of the particles A is 5% to 50%;

(b) a resistivity of the particle A is 6 Ω·cm to 10 Ω·cm; and (c) the particle A comprises a compound represented by a formula $Li_{1+a}Ni_xMn_yCo_zM_mO_2$, wherein $-0.05≤a<0.3$, $0.8≤x<1$, $0<y≤0.2$, $0<z≤0.2$, $0<m<0.2$, and the element M is one or more selected from the group consisting of Al, Ti, W, Zr, Nb, In, Ru, Sb, Sr and Y.

13. The electronic device according to claim 11, wherein the particles A comprise broken particles, and the broken particles satisfy at least one of the conditions (d) to (e):

(d) based on the total area of the cross section of the positive electrode in the direction perpendicular to the positive current collector, a total area percent of the broken particles is not greater than 15%; and (e) based on a total area of the particles A, the total area percent of the broken particles is not greater than 30%.

14. The electronic device according to claim 11, wherein the particles B satisfy at least one of the conditions (f) to (h):

(f) based on the total area of the cross section of the positive electrode in the direction perpendicular to the positive current collector, the total area percent of the particles B is 5% to 60%;

(g) a resistivity of the particle B is 20 Ω·cm to 40 Ω·cm; and (h) the particle B comprises a compound represented by a formula $Li_{1+a}Ni_xMn_yCo_zM_mO_2$, wherein $-0.05≤a<0.3$, $0.8≤x<1$, $0<y≤0.2$, $0<z≤0.2$, $0<m<0.2$, and the element M is one or more selected from the group consisting of Al, Ti, W, Zr, Nb, In, Ru, Sb, Sr and Y.

15. The electronic device according to claim 11, wherein the positive active material layer satisfies at least one of the conditions (i) to (j):

(i) a porosity of the positive active material layer is less than or equal to 25%; and (j) in a TG-MS test, a positive active material of the positive active material layer produces an oxygen release peak at 230° C. to 245° C.

16. The electronic device according to claim 11, wherein the ratio of the total area percent of the particles A to the total area percent of the particles B is 0.23 to 1.22.

17. The electronic device according to claim 11, wherein the positive active material layer further comprises a binder and a conductive agent, and, based on a total mass of the positive active material layer, a weight percent of the binder is 1.25% to 5%.

18. The electronic device according to claim 11, wherein the positive electrode further comprises a functional layer, and the functional layer is disposed on the positive active material layer and/or disposed between the positive active material layer and the positive current collector.

19. The electronic device according to claim 18, wherein the functional layer satisfies at least one of the conditions (1) to (4):

(1) the functional layer is disposed on the positive active material layer, the positive active material layer is disposed on the positive current collector, and a ratio of a thickness of the positive active material layer to a thickness of the functional layer is 99:1 to 50:50;

(2) the functional layer is disposed between the positive active material layer and the positive current collector, and the ratio of the thickness of the positive active material layer to the thickness of the functional layer is 99:1 to 50:50;

(3) the functional layer is disposed on the positive active material layer, the functional layer is disposed between the positive active material layer and the positive current collector, and the ratio of the thickness of the positive active material layer to the thickness of the functional layer is 99:1 to 50:50; and (4) the functional layer comprises a material C, the material C comprises at least one of lithium cobalt oxide, lithium iron phosphate, lithium manganese iron phosphate, or lithium manganese oxide, and a particle diameter $D_{v50}$ of the material C is 0.5 μm to 6 μm.

20. The electronic device according to claim 11, wherein a deformation rate of the positive current collector is less than or equal to 32%.

* * * * *